United States Patent [19]

Moloney et al.

[11] Patent Number: 5,526,486
[45] Date of Patent: Jun. 11, 1996

[54] APPARATUS FOR DETECTING UNDEFINED STATES OF A FINITE STATE MACHINE (FSM) AND RESETTING THE FSM UPON DETECTION

[75] Inventors: David Moloney, Cornaredo; Maurizio Zuffada, Milan; Gianfranco Vai; Fabrizio Sacchi, both of Pavia, all of Italy

[73] Assignee: SGS-Thomson Microelectronics S.r.l., Agrate Brianza, Italy

[21] Appl. No.: 42,856

[22] Filed: Apr. 5, 1993

Related U.S. Application Data

[63] Continuation of Ser. No. 779,680, Oct. 21, 1991, abandoned.
[51] Int. Cl.$^6$ .................................................. G06F 11/30
[52] U.S. Cl. .............................. 395/185.02; 364/DIG. 1; 364/265; 364/265.6; 364/266.4; 395/185.01; 371/57.1
[58] Field of Search ........................ 371/25.1, 26, 57.1, 371/57.2, 60, 68.3; 395/575, 775, 800, 183.01, 183.03, 183.13, 183.15, 185.01, 185.02

[56] References Cited

U.S. PATENT DOCUMENTS

| | | | |
|---|---|---|---|
| 3,982,111 | 9/1976 | Lerner et al. ............................ | 371/21.2 |
| 4,356,546 | 10/1982 | Whiteside et al. ....................... | 395/575 |
| 4,672,609 | 6/1987 | Humphrey et al. ..................... | 371/21.2 |
| 4,727,548 | 2/1988 | Dickey ................................... | 371/49.4 |
| 4,845,712 | 4/1989 | Sanner et al. ........................... | 371/25 |
| 4,853,932 | 8/1989 | Nitschke et al. ........................ | 371/68 |
| 5,113,187 | 5/1992 | Gorshe .................................... | 341/73 |

OTHER PUBLICATIONS

Patent Abstracts of Japan, vol. 13, No. 412 (P–932) 12 Sep. 1989 and JP–A–11 52 379 (Yokogawa Hewlett Packard).
IBM Technical Disclosure Bulletin, vol. 21, No. 5, Oct. 1978, New York, U.S. p. 2022, Beaven et al. "Verification That A Logic Design Does Not Enter An Illegal State."Section EI, Week E05, 17 Mar. 1982, Derwent Publications Ltd., London, GB; Class T, An B2238E and SU–826 356, Mazurenko.
Derwent Research Disclosure, RD 290074, 10 Jun. 1988, DW8831, An 88–218147; Anonymous: "Finite State Machine for CKD Execution by Control Unit—Starts in State 1 and Proceeds to Different States Depending Upon Received CCW."

*Primary Examiner*—Thomas C. Lee
*Assistant Examiner*—Lance L. Barry
*Attorney, Agent, or Firm*—Townsend and Townsend and Crew

[57] ABSTRACT

A finite-state machine has combinatorial logic connected to a status memory which receives future state signals from the finite-state machine and sends current state signals to the finite-state machine. The combinatorial logic also receives and generates input and output signals which are external to the finite-state machine. The finite-state machine compares the future state signals to at least one reference level to set an error message to reset the finite-state machine for reliable computing and adjustment.

9 Claims, 1 Drawing Sheet

5,526,486

APPARATUS FOR DETECTING UNDEFINED STATES OF A FINITE STATE MACHINE (FSM) AND RESETTING THE FSM UPON DETECTION

This is a Continuation of application Ser. No. 07/779,680 filed Oct. 21, 1991, now abandoned.

BACKGROUND OF THE INVENTION

1. Field of the Invention

The present invention relates to a finite-state machine for reliable computing and adjustment systems.

2. Description of the Related Art

Finite-state machines (FSM) are used to provide a sequence of predetermined actions in digital computing systems. Said finite-state machines (FSM) are usually composed of a combinatorial logic 1 and of a state memory 2, as illustrated in FIG. 1. The signals of the outputs 3 and the signals of the future states 4 are generated by the combinatorial logic 1 from the signals of the inputs 6 and from the signals of the current states 7, and the electronics of the combinatorial logic 1 performs the following logic operation:

if (CURRENT STATE) and (INPUTS) then (FUTURE STATE) and (OUTPUTS).

Finite-state machines can be implemented in bipolar technology, in MOS technology or in gallium arsenide (GaAs) technology, using programmable logic arrays (PLA), or nonvolatile memories (ROM), or logic gate arrays, or completely or partially dedicated cells.

Logical machines have a fundamental property, i.e. if m is the number of external input signals 6 and n is the number of the signals of the current states 7, then the complexity, i.e. the number of product terms, of the combinatorial logic 1 is equal to $_2(m+n)$. This complexity value naturally rises exponentially as the numbers m and n become larger, even independently.

Due to the considerable number of input signals, i.e. of the external input signals 6 and of the current state signals 7, finite-state machines are seldom completely defined, or rather the number of states used is smaller than the maximum capacity of the finite-state machine itself, so that there is typically large set of undefined states.

As an unwanted result, if the finite-state machine assumes one of the undefined states, for example due to an interruption in the power supply or to noise of whatever origin, said finite-state machine has an unwanted and unknown behavior.

This last behavior is absolutely unacceptable, especially in those cases in which finite-state machines control an aircraft, an electric nuclear power plant, a telephone network or a medical instrument.

A solution currently used in order to obviate the unwanted behaviors of the finite-state machine consists in using a so-called watchdog timer, illustrated in FIG. 2, i.e. a programmable timer which, if it is not periodically reset, generates an interrupt which resets the entire system.

Said watchdog timer is composed of a counter 8 which is connected to a comparator 9. Said comparator receives in input a word 9a of n bits which represents the period of the watchdog timer, and sets a system reset signal 11. The system reset signal 11 is set on input to an OR logical gate 12, and a second input to said logical gate 12 is a reset signal 13. The OR logical gate 12 sets, toward the counter 8, a counter reset signal 14 which resets said counter either by means of the system reset signal 11, in case of a system reset, or by means of the reset signal 13.

The disadvantages of this solution are numerous and can be summarized in the need for special circuits, such as the watchdog timer, and in the need for the user program to constantly check whether the watchdog timer must be reset or not. This last disadvantage requires the use of a further timer which generates a signal 8a, either of a circuital type or of a software type, and therefore increases the cost of the development of the user program, reducing its performance, due to the need for constant checking of the watchdog timer.

There are also problems related to the operation of the watchdog timer: the finite-state machine can in fact have an abnormal behavior lasting up to one time period of the watchdog timer; in other words, if any event induces the finite-state machine to malfunction immediately after the resetting of the watchdog timer, an entire time period or machine cycle must elapse before the new setting of either a system reset signal 11 or a reset signal 13.

Finally, and more dangerously, the watchdog timer is reset by the output of a finite-state machine and does not take into account the current state of said machine. The watchdog timer can thus be reset by the finite-state machine although said machine is in an undefined state and abnormal behavior continues absolutely undisturbed.

A better solution consists in providing a known state as future state for each of the undefined states, but this solution entails up to $2^n$-k additional product terms, where n is the number of bits of a state and k is the number of states defined in the finite-state machine. In the case of 8 state bits ($2^8$=256) and of 129 defined states, another 127 product terms are required. This last solution has the disadvantage that the finite-state machine does not interrupt its operations after an undefined state has been reached unless this has been specified beforehand in the defined state vector.

SUMMARY OF THE INVENTION

The aim of the present invention is to eliminate or substantially reduce the disadvantages described above in known types of FSM by providing a finite-state machine for reliable computing and adjustment systems which eliminates the use of a watchdog timer.

Within the scope of the above described aim, an object of the present invention is to provide a finite-state machine which reduces circuital and user program complexity.

Another object of the present invention is to provide a finite-state machine which substantially eliminates the possibility of any abnormal behavior due to the assuming of an undefined state on the part of said machine.

A further object of the present invention is to provide a finite-state machine which eliminates the possibility of the persistence of an abnormal behavior, detecting the undefined state in any situation.

Not the least object is to provide a finite-state machine which interrupts its operating cycle and/or the operating cycle of the entire system which comprises it if an undefined state is reached.

Not the least object of the present invention is to provide a finite-state machine which is relatively easy to implement and at competitive costs.

This aim, these objects and others which will become apparent hereinafter are achieved by a finite-state machine for reliable computing and adjustment systems according to the invention, comprising a combinatorial logic connected to a state memory by means of connections which carry future state signals and of connections which carry current state signals, said combinatorial logic comprising input terminals for input signals which are external to said finite-state machine and output terminals for output signals generated by said combinatorial logic, characterized in that it comprises means suitable for comparing said future state signals to at least one reference level and for setting an error signal toward means for resetting said finite-state machine.

BRIEF DESCRIPTION OF THE DRAWINGS

Further characteristics and advantages of the invention will become apparent from the description of a preferred but not exclusive embodiment of a finite-state machine according to the invention, illustrated only by way of non-limitative example in the accompanying drawings, wherein.

DESCRIPTION OF THE PREFERRED EMBODIMENTS

Figure 1:
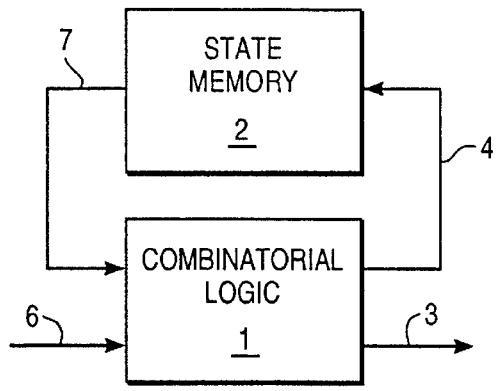
FIG. 1 is a diagram of a known finite-state machine.
Figure 3:
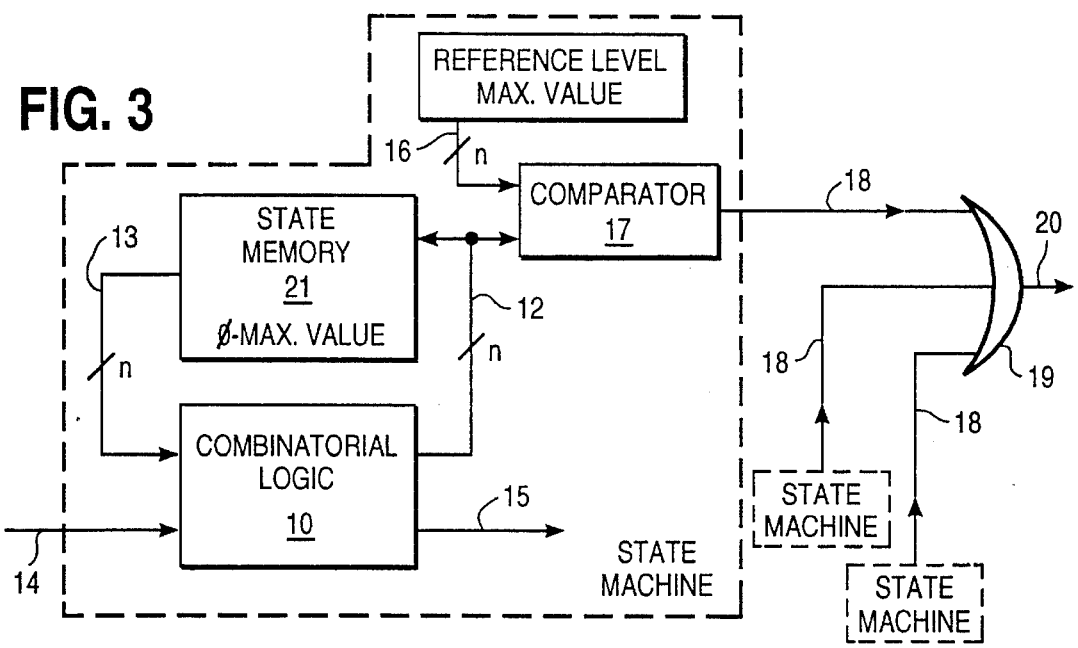
FIG. 3 is a diagram of a finite-state machine according to the invention.
Figure 2:
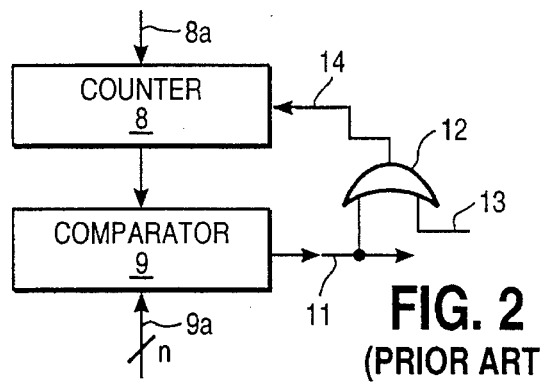
FIG. 2 is a diagram of a known watchdog timer.

With reference to FIG. 3, a finite-state machine comprises a combinatorial logic 10 which is connected to a state memory 11 by means of connections which carry future state signals 12, each having n bits, and connections which carry Current state signals 13, each having n bits.

The combinatorial logic 10 comprises input terminals 14 for external input signals and output terminals 15 for output signals generated by said combinatorial logic 10.

The finite-state machine furthermore comprises means for comparing the future state signals 12 to at least one reference level 16, also having n bits. The comparison means comprise at least one comparator 17 which has at least two input terminals, indicated by the reference numerals 12 and 16. Each input terminal 12 and 16 is divided into a plurality n of conductors, each carrying an elementary item of information or bit of the future state signals 12 and of the reference level 16.

Conveniently, if the future state signal 12 assumes a value higher than the reference level 16, then the comparator 17 sets an error signal 18 toward means for resetting the finite-state machine.

Advantageously, the reference level 16 is set to the maximum value assumed by the used or defined states, which are assigned sequentially starting from the zero value up to the n-th value, with the rule that the absolute maximum of the possible states is equal to $2^n-1$.

Conveniently, the reset means comprise an OR logical gate 19 with a plurality of input terminals 18 and at least one output terminal 20. The plurality of input terminals 18 is connected to the output terminals of the comparators 17, each of which is comprised in a finite-state machine. In this manner it is advantageously possible to obtain a signal for interrupting the operation of an apparatus of whatever complexity, even if one of the m finite-state machines has an undefined state.

Figure 5:
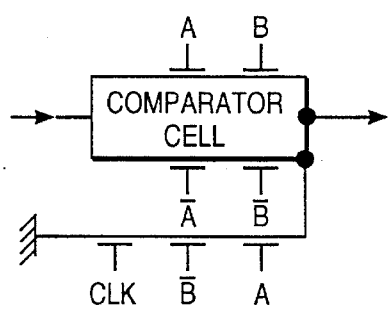
FIG. 5 is a diagram of a cell of the dynamic comparator in MOS technology.
Figure 4:
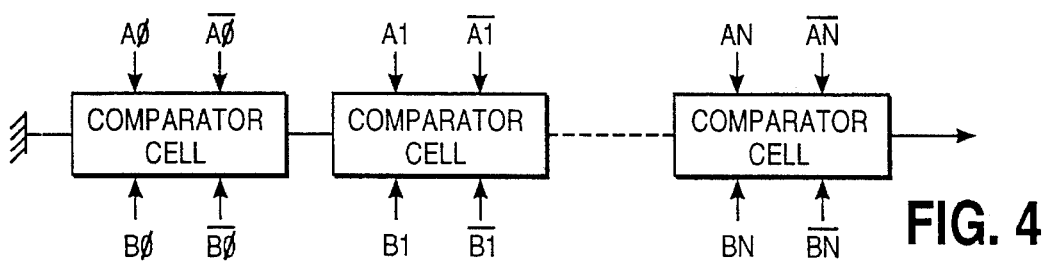
FIG. 4 is a diagram of a dynamic comparator in MOS technology.

The comparator 17 is of a well-known type, either dynamic or static. AMOS technology dynamic comparator is illustrated in FIG. 4 by way of example. It is composed of a plurality of cells of the type illustrated in FIG. 5. In FIG. 4, the terminals indicated by A0, A1, AN, B0, B1, BN and the overscored counterparts are the bits of the signals A and B, and the comparator checks whether A is greater than B. The cell of FIG. 5 comprises the terminals A, B, the overscored counterparts and a terminal CLK which is the cell's timing signal.

The overscored terminals indicate that the input signal is the logically negated value with respect to the signal present on the non-overscored terminals.

Other types of usable comparators are, still by way of example, those published in the IEEE JOURNAL OF SOLID-STATE CIRCUITS, vol. 23, no. 24, Aug. 1988, page 1016, or those published in ELECTRONICS, Sept. 22, 1983.

The operation of the invention is identical to that of known finite-state machines, for the states which are defined during the design stage, whereas if the finite-state machine has an undefined state, therefore a state higher than the reference level 16, the comparator 17 immediately sets an error signal 18, which is converted into the interrupt signal 20 by the OR logical gate 19. If the apparatus is controlled by a plurality of finite-state machines according to the invention, it can be interrupted in its operation by a single error signal 18 arriving from a single finite-state machine, also advantageously allowing the possibility of detecting the cause of the attainment of said undefined state.

The invention thus conceived is susceptible to numerous modifications and variations, all of which are within the scope of the inventive concept.

All the details may furthermore be replaced with other technically equivalent elements.

In practice, the materials employed, as well as the dimensions, may be any according to the requirements.

We claim:

1. A finite-state machine comprising a combinatorial logic having input terminals for external input signals and output terminals for output signals generated by said combinatorial logic, said combinatorial logic assuming one of a plurality of states at a time;

a state memory connected to said combinatorial logic so that said combinatorial logic receives signals indicative of a previous state of said combinatorial logic as input signals and said state memory receives and stores signals indicative of a present state of said combinatorial logic;

means, connected to said combinatorial logic and to a reference level, for comparing said signals indicative of said present state of said combinatorial logic to set signals from said reference level, said reference level signals defining a boundary value between defined and undefined states in said finite-state machine, said comparing means setting an error signal when said finite-state machine is in an undefined state; and means connected to said comparing means for resetting said finite-state machine upon receiving said error signal.

2. The finite-state machine according to claim 1, wherein said comparing means comprises at least one comparator having at least two input terminals, each input terminal connected to a plurality of conducting lines, each of which carrying an elementary item of information of said present state signals and of said reference level.

3. The finite-state machine according to claim 2, wherein said reference level is set to the maximum value assumed by the defined states, said states sequentially starting from the zero value.

4. The finite-state machine according to claim 3, wherein said resetting means comprising an OR logical gate with an plurality of input terminals and at least one output terminal, said plurality of input terminals being connected to the output terminals of a plurality of said comparators, each of which is part of a finite-state machine.

5. A digital system having a finite-state machine, said finite-state machine comprising combinatorial logic receiving input signals, at least some of said input signals being external to said finite-state machine, said combinatorial logic assuming one of a plurality of digital states at a time responsive to said input signals for generating output signals;

a memory connected to said combinatorial logic in such a manner that said memory receives signals indicative of said one digital state from said combinatorial logic for storage and said combinatorial logic receives signals indicative of a previously digital state of said combinatorial logic as input signals thereto from said memory;

means for maintaining set signals of a reference digital state, said reference digital state defining a boundary between defined and undefined digital states for said finite state machine; and means connected to said maintaining means and said combinatorial logic for comparing said reference digital state signals and said one digital state signals;

whereby an undefined digital state for said finite-state machine can be detected.

6. The computing system according to claim 5 wherein said reference digital state is the maximum value of all defined digital states.

7. The computing system according to claim 6 wherein the minimum value of all defined digital states is zero.

8. The computing system according to claim 5 further comprising means connected to said comparing means for resetting said computer system upon the detection of an undefined digital state.

9. The computing system according to claim 8 wherein said computing system has a plurality of said finite-state machines and wherein said resetting means comprises an OR logical gate having an output terminal and a plurality of input terminals, each input terminal connected to a comparing means of one of said finite-state machines, said output terminal generating a resetting signal upon the detection of an undefined digital state in any one of said finite-state machines.

* * * * *